United States Patent
Spörl et al.

(10) Patent No.: US 7,324,884 B2
(45) Date of Patent: Jan. 29, 2008

(54) METHOD FOR DRIVING A VEHICLE WITH MANUALLY SHIFTED TRANSMISSION, AUTOMATIC TRANSMISSION OR CONTINUOUS TRANSMISSION ON STREETS WITH LOW FRICTION VALUE

(75) Inventors: Peter Spörl, Ravensburg (DE); Oliver Iden, Weißensberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 197 days.

(21) Appl. No.: 11/181,642

(22) Filed: Jul. 14, 2005

(65) Prior Publication Data

US 2006/0014609 A1    Jan. 19, 2006

(30) Foreign Application Priority Data

Jul. 15, 2004    (DE)  ............... 10 2004 034 097

(51) Int. Cl.
*B60K 28/16*    (2006.01)
(52) U.S. Cl. ...................... 701/54; 180/197
(58) Field of Classification Search ............... 701/54, 701/82, 83, 84, 90, 85, 86; 180/197; 477/34, 477/54, 57, 64, 73
See application file for complete search history.

(56) References Cited

U.S. PATENT DOCUMENTS

| | | | | |
|---|---|---|---|---|
| 4,971,164 A * | 11/1990 | Fujita et al. | ............... | 180/197 |
| 5,278,761 A * | 1/1994 | Ander et al. | ............... | 701/84 |
| 5,732,380 A * | 3/1998 | Iwata | ............... | 701/85 |
| 5,737,713 A * | 4/1998 | Ikeda et al. | ............... | 701/84 |
| 6,182,003 B1 * | 1/2001 | Maier-Landgrebe | ......... | 701/84 |
| 6,757,603 B2 * | 6/2004 | Nozaki | ............... | 701/51 |

FOREIGN PATENT DOCUMENTS

| | | |
|---|---|---|
| DE | 41 20 546 A1 | 12/1992 |
| DE | 196 11 431 A1 | 9/1997 |
| DE | 100 60 346 A1 | 6/2001 |
| DE | 199 63 354 A1 | 7/2001 |
| DE | 102 38 218 A1 | 10/2003 |
| DE | 102 38 754 A1 | 10/2003 |
| DE | 102 38 216 A1 | 11/2003 |

* cited by examiner

*Primary Examiner*—Dalena Tran
(74) *Attorney, Agent, or Firm*—Davis Bujold & Daniels, PLLC

(57) ABSTRACT

A method for operating a motor vehicle with a manual transmission, a multi-ratio automatic transmission or a continuously variable transmission, on a road with a low friction coefficient, the engine torque is reduced or, as the case may be, decreased, which leads to a reduction of the wheel drive torque without changing the starting gear ratio.

12 Claims, 2 Drawing Sheets

METHOD FOR DRIVING A VEHICLE WITH MANUALLY SHIFTED TRANSMISSION, AUTOMATIC TRANSMISSION OR CONTINUOUS TRANSMISSION ON STREETS WITH LOW FRICTION VALUE

This application claims priority from German Application Serial No. 10 2004 034 097.8 filed Jul. 15, 2004.

FIELD OF THE INVENTION

The present invention relates to a method for operating a motor vehicle with a manual transmission, multi-ratio automatic transmission or a continuously variable transmission on roads with a low friction coefficient. The invention relates especially to a driving program, which will improve the driving situation on roads with a weather-related reduced friction coefficient, such as on ice or snow, and especially during starting.

BACKGROUND OF THE INVENTION

In some vehicles, which contain automatic transmissions, a winter program can be pre-selected with a switch or a push button. Hereby, the winter program for multi-ratio automatic transmissions according to the state of the art differs from the standard driving program especially in that the starting takes place in the second or third gear in such a way that, because of the longer starting gear ratio with the same gas pedal position and engine speed, a reduction of the drive torque on the wheel compared to the standard program will be achieved. At higher gas pedal values, according to the state of the art the full driving performance will be made available through downshifting.

In a continuously variable transmission (CVT transmission) without a clutch on the output side no change can be made to the gear ratio of the variable speed gear when the vehicle is standing still since the variable speed gear disk sets are not turning. Therefore, a longer starting gear ratio also cannot be achieved within the scope of a winter program for reducing the drive torque on the wheel.

The present invention is based on the task of establishing a method for operating a motor vehicle with a continuously variable transmission on roads with a low friction coefficient (winter driving program), which enables the reduction of the drive torque on the wheel. Additionally, the method according to the invention should also be suitable for vehicles with a manual transmission, a multi-ratio automatic transmission or automatic shift manual transmission.

SUMMARY OF THE INVENTION

Accordingly, for operating a motor vehicle comprising a continuously variable transmission on roads with a low friction coefficient it is suggested to reduce the engine torque or, as the case may be, diminish it, which will lead to the reduction of the wheel drive torque, also without changing the starting gear ratio. This measure can be advantageously used also for vehicles with a multi-ratio automatic transmissions and manual transmissions.

According to the invention, the decrease of the engine torque can be accomplished directly in the motor-actuated control or via engagement in the engine on the part of the transmission. In contrast to the state of the art the concept according to the invention can be utilized for reducing the wheel drive torque when driving forward or in reverse.

BRIEF DESCRIPTION OF THE DRAWINGS

The invention will be described in greater detail in the following by way of example of the enclosed figures.

DETAILED DESCRIPTION OF THE INVENTION

Figure 1:
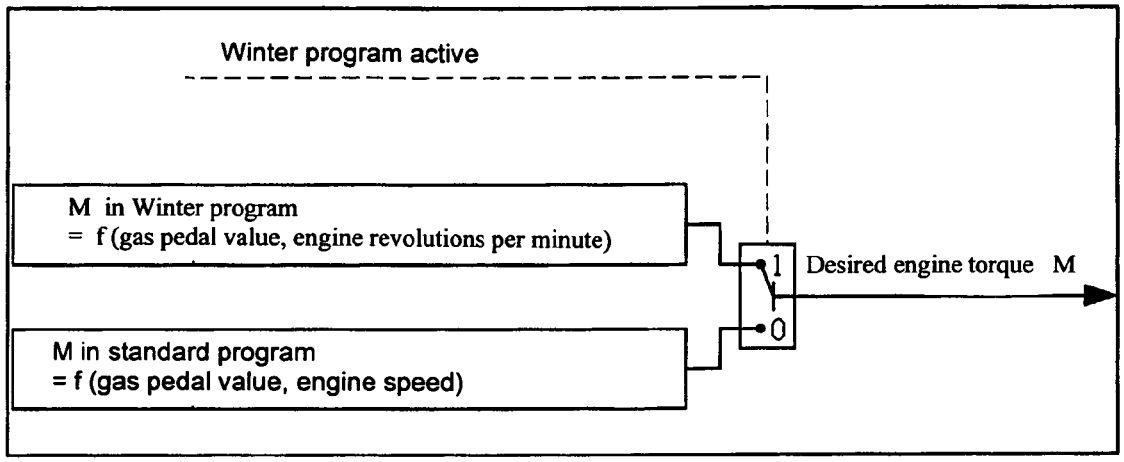
FIG. 1 is a block diagram of a first variant of the method according to the invention.

FIG. 1 represents a first variant of the method according to the invention. Hereby, within the scope of the winter driving program, the values of the engine torque as a function of the engine speed and the gas pedal value (engine torque M=f (gas pedal value, engine speed)) are modified such that they are reduced in comparison to the standard program. Within the scope of an advantageous further development, the values of the engine torque at high gas pedal values correspond to the values of the standard driving program.

Figure 2:
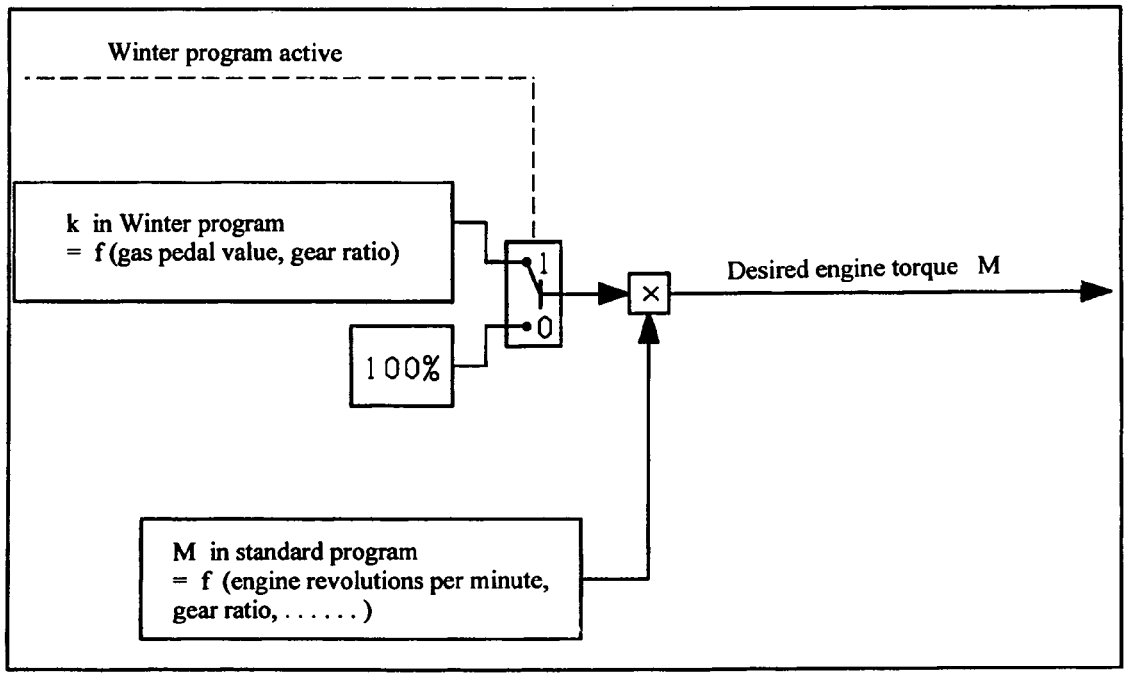
FIG. 2 is a block diagram of a second variant of the method according to the invention.

According to the variant of the method according to the invention shown in FIG. 2, the engine torque on the road with a low friction coefficient, that is to say, in the winter driving program, will be modified or, as the case may be, reduced in comparison to the standard driving program, which is dependent on the engine speed, the gear ratio, the vehicle speed, and or the gas pedal value, by a factor k. In this case it can also be anticipated that at high gas pedal values the engine torque will not be reduced (the factor k assumes the Value 1).

Figure 3:
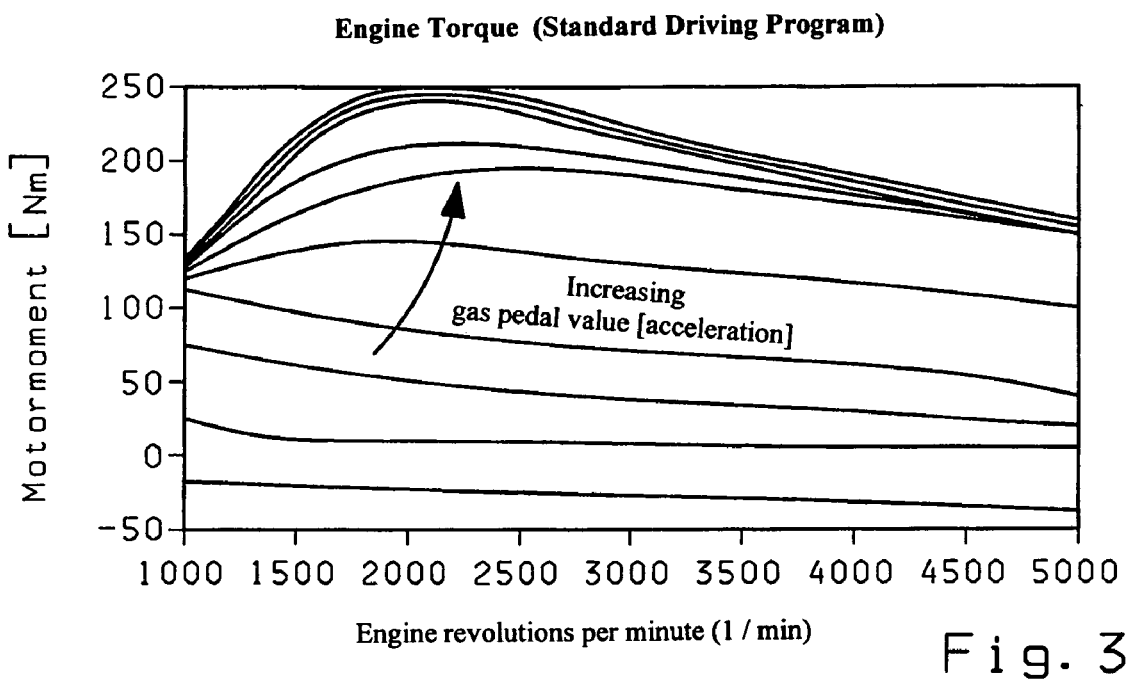
FIG. 3 is the course of the engine torque as a function of the engine speed and the gas pedal value within the scope of the standard driving program.
Figure 4:
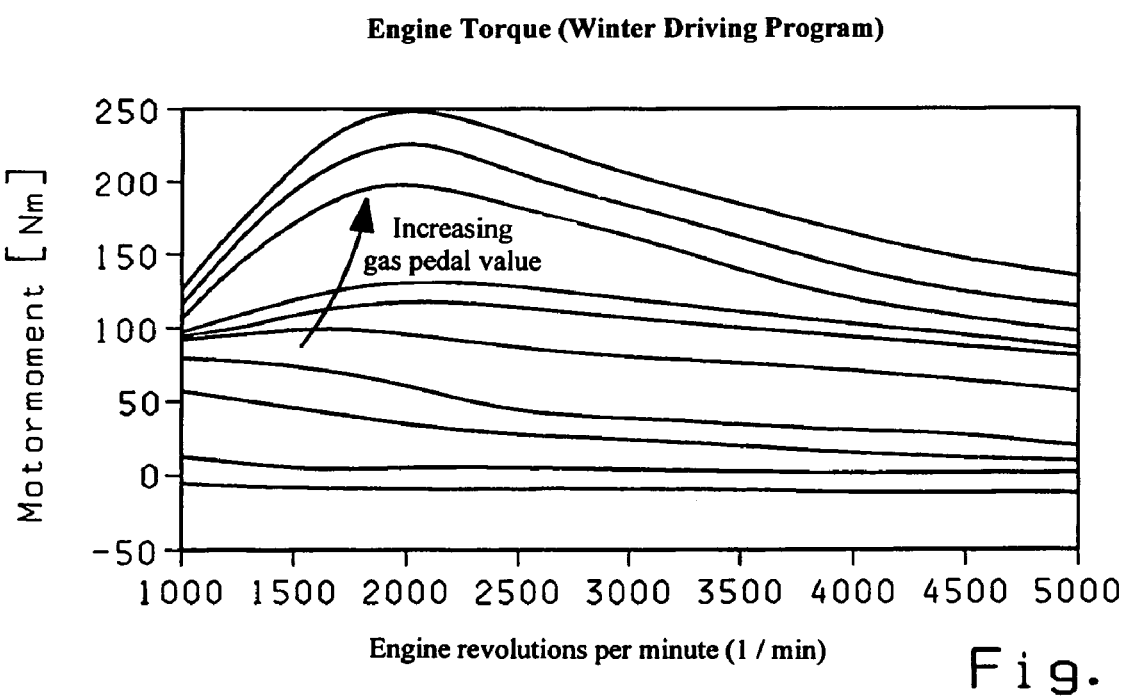
FIG. 4 is the course of the engine torque as a function of the engine speed and the gas pedal value within the scope of the standard driving program according to the invention.

Represented in FIG. 3 is the course of the engine torque in the standard driving program as a function of the engine speed and the gas pedal value. From the comparison with the course of the engine torque in the winter driving program shown in FIG. 4, it becomes apparent that through the inventive engine engagement the engine torque is significantly reduced at the same engine speed and the same gas pedal value, which leads to improved starting conditions. Additionally it will become obvious from the comparison of the two figures that at high gas pedal values the engine torque values will remain the same. The reduction of the engine torque can be accomplished, as has been explained already, either directly in the motor-actuated control or by means of engagement in the engine on the part of the transmission. Furthermore, according to the invention, several winter driving programs can be provided, which reduce accordingly the engine torque in dependence on the friction value of the road. That means that, in this case for example, the factor k could also depend on the road friction coefficient.

The invention claimed is:

1. A method for operating a motor vehicle with one of a manual transmission, multi-ratio automatic transmission or a continuously variable transmission on a road having a low friction coefficient, the method comprising the steps of:

providing a standard driving program in a transmission control for controlling one of the manual transmission, multi-ratio automatic transmission or the continuously variable transmission according to a plurality of desired transmission gear ratios, including a transmission starting gear ratio;

switching from the standard driving program in the transmission control to a modified driving program for the mad having a low friction coefficient;

reducing an engine torque in the modified driving program to accordingly reduce a wheel drive torque without changing the engine speed; and maintaining the transmission starting gear ratio of the standard driving program in the modified driving program.

2. The method according to claim 1, further comprising the step of directly reducing tie engine torque according to one of an engine controller and by transmission engagement with an engine.

3. The method according to claim 1, further comprising the step of determining a value of the engine torque as a function of the engine speed and a gas pedal value and modifying the value of the engine torque in such a way so as to be reduced in comparison with the standard program.

4. The method according to claim 1, wherein engine torque in the modified driving program as compared to the standard driving program, is modified by a factor k dependent on at least one of an engine speed, a gear ratio, a vehicle speed and a gas pedal value.

5. The method according to claim 1, further comprising the step of corresponding engine torque values at a high gas pedal value in the modified driving program to value of the standard driving program.

6. The method according to claim 1, further comprising the step of relating desired reduction levels of engine torque to relative road friction coefficients and modifying the engine torque accordingly.

7. A method for operating a motor vehicle with a continuously variable transmission on a road having a low friction coefficient, the method comprising the steps of:

providing a standard driving program in a transmission control for controlling the continuously variable transmission according to a plurality of desired transmission gear ratios, Including a transmission starting gear ratio;

switching from the standard driving program in the transmission control to a modified driving program for the road having a low friction coefficient;

reducing an engine torque in the modified driving program to accordingly reduce a wheel drive torque without changing the engine speed; and maintaining the transmission starting gear ratio of the standard driving program in the modified driving program.

8. The method for operating a motor vehicle with a continuously variable transmission on a road having a low friction coefficient as set forth in claim 7, the method further comprising the steps of reducing the engine torque in the modified driving program to accordingly reduce the wheel drive torque without changing the engine speed in either forward and reverse driving gears of the motor vehicle.

9. A method for operating a motor vehicle with one of a manual transmission, mult-ratio automatic transmission or a continuously variable transmission on a road having a low friction coefficient, the method comprising the steps of:

providing a standard driving program defining an engine torque value as a function of at least a gas pedal value and an engine speed in a transmission control for controlling one of the manual transmission, multi-ratio automatic transmission or the continuously variable transmission according to a plurality of desired transmission gear ratios, including a transmission starting gear ratio;

modifying the engine torque value to obtain a modified driving program having a reduced engine torque value and a reduced wheel torque value in comparison to the standard driving program;

switching from the standard driving program in the transmission control to the modified driving program for the road having a low friction coefficient; and maintaining the transmission starting gear ratio of the standard driving program in the modified driving program.

10. The method for operating a motor vehicle with a continuously variable transmission on a road having a low friction coefficient as set forth in claim 9, the method further comprising the steps of modifying the engine torque value to obtain the modified driving program having the reduced engine torque value and the reduced wheel torque value in comparison to the standard driving program while maintaining the engine speed and gas pedal value.

11. The method for operating a motor vehicle with a continuously variable transmission on a road having a low friction coefficient as set forth in claim 10, the method further comprising the steps of determining a desired range for the gas pedal value within which the engine torque will not be reduced.

12. The method for operating a motor vehicle with a continuously variable transmission on a road having a low friction coefficient as set forth in claim 11, the method further comprising the steps of reducing the engine torque in the modified driving program to accordingly reduce the wheel drive torque without changing the engine speed in either forward and reverse driving gears of the motor vehicle.

* * * * *